(12) United States Patent
Barton et al.

(10) Patent No.: US 7,398,881 B2
(45) Date of Patent: Jul. 15, 2008

(54) RETAINER RING FOR A WIRE PACKAGE AND METHOD OF MAKING THE SAME

(75) Inventors: David J. Barton, Twinsburg, OH (US); Michael A. Carroscia, Newbury, OH (US)

(73) Assignee: Lincoln Global, Inc., City of Industry, CA (US)

( * ) Notice: Subject to any disclaimer, the term of this patent is extended or adjusted under 35 U.S.C. 154(b) by 376 days.

(21) Appl. No.: 11/222,332

(22) Filed: Sep. 8, 2005

(65) Prior Publication Data

US 2007/0051648 A1 Mar. 8, 2007

(51) Int. Cl.
*B65D 85/67* (2006.01)
(52) U.S. Cl. .................. 206/408; 206/409; 242/171
(58) Field of Classification Search .......... 206/389, 206/395, 397, 398, 407, 408, 409, 413, 414, 206/415, 416; 242/128, 129, 171, 172
See application file for complete search history.

(56) References Cited

U.S. PATENT DOCUMENTS

| 932,808 | A | * | 8/1909 | Pelton | .................. 206/415 |
| 3,729,092 | A | * | 4/1973 | Marcell | .................. 206/303 |
| 4,869,367 | A | * | 9/1989 | Kawasaki et al. | ........... 206/409 |
| 5,277,314 | A | | 1/1994 | Cooper et al. | |

(Continued)

FOREIGN PATENT DOCUMENTS

CN 1626423 A 6/2005

(Continued)

OTHER PUBLICATIONS

European Search Report for European Application No. 06002607.7, Jun. 19, 2007.

*Primary Examiner*—Jacob K Ackun, Jr.
(74) *Attorney, Agent, or Firm*—Fay Sharpe LLP (57) ABSTRACT

A retainer ring for use in a welding wire package wherein the package houses a coil of welding wire positioned in a coil receiving cavity in the package. The coil extends about a vertically extending coil axis and includes a coil bottom, an oppositely facing coil top, a radially extending outer cylindrical surface and a radially inner cylindrical surface. The ring has an annular ring body extending about a ring axis with an outer peripheral edge and an inner peripheral edge. The ring body further includes a top surface extending between the outer and inner peripheral edges and an oppositely facing bottom surface extending between the outer and inner peripheral edges. The bottom surface of the body can be configured to rest on the coil top and the outer peripheral edge is sized to allow the ring to descend within the wire receiving cavity as the wire is unwound from the wire coil. The ring body further includes a thickness between the top and the bottom surfaces of the ring body such that the ring body can be rigid. The ring body further includes a plurality of upwardly opened pockets each having a pocket depth and a pocket perimeter and have a pocket density less than the density of the ring body.

33 Claims, 8 Drawing Sheets

U.S. PATENT DOCUMENTS

| | | |
|---|---|---|
| 5,692,700 A | 12/1997 | Bobeczko |
| 5,819,934 A | 10/1998 | Cooper |
| 6,464,077 B1 * | 10/2002 | Liu .............................. 206/388 |
| 6,745,899 B1 | 6/2004 | Barton |
| 6,889,835 B2 * | 5/2005 | Land ........................... 206/408 |
| 6,913,145 B2 | 7/2005 | Barton et al. |
| 7,152,735 B2 * | 12/2006 | Dragoo et al. .............. 206/408 |

FOREIGN PATENT DOCUMENTS

| | | |
|---|---|---|
| EP | 0 519 424 A1 | 12/1992 |
| JP | 04133973 | 5/1992 |
| WO | WO 03/106096 A1 | 12/2003 |

* cited by examiner

FIG. 20 large volume of welding wire is looped in the drum around a
RETAINER RING FOR A WIRE PACKAGE AND METHOD OF MAKING THE SAME The present invention relates to welding wire packaging and, more particularly, to an improved retainer ring for a welding wire package.

INCORPORATION BY REFERENCE

Welding wire used in high production operations, such as robotic welding stations, is provided in a package having over 200 pounds of wire. The package is often a drum where a large volume of welding wire is looped in the drum around a central core or a central clearance bore. During transportation and use, the level of looped wire in the drum decreases. To control the transportation and payout of the wire, it is standard practice to provide an upper, weighted retainer ring. An early ring is shown in Kawasaki U.S. Pat. No. 4,869,367, wherein the ring slides by its own weight along the inner surface of the drum by outwardly extending resilient members. These members center the ring over the top of the looped wire, so the wire can be pulled to the center and payed out during welding. This patent is incorporated by reference herein for showing the same.

A similar retainer ring is shown in Cooper U.S. Pat. No. 5,277,314, which is directed to an improved upper retaining ring having an inner contoured surface to facilitate wire payout without tangles. This patent is incorporated by reference herein. Another retainer ring is disclosed in Cooper U.S. Pat. No. 5,819,934 wherein the ring is described as having a function during transportation to move downwardly as the welding wire settles in the drum. This patent is also incorporated by reference herein for showing the same.

Yet another ring configuration is shown in Barton U.S. Pat. No. 6,745,899, which discloses a multi-ring arrangement for controlling the unwinding of the welding wire from a wire coil. The multiple rings are positioned on the coil top and together control the flow of the welding wire being unwound from the wire coil. Barton U.S. Pat. No. 6,745,899 is also incorporated by reference herein for showing the same.

Barton U.S. Pat. No. 6,913,145 discloses a welding wire package with a ribbed wall configuration wherein the retainer or payout ring is configured to mate with the ribbed wall configuration to prevent wire tangling. Barton U.S. Pat. No. 6,913,145 is incorporated by reference herein for showing the same.

All references incorporated by reference herein form part of this specification and, therefore, will not be referenced with particularity in the following specification.

BACKGROUND OF INVENTION

In the welding industry, tremendous numbers of robotic welding stations are operable to draw welding wire from a package as a continuous supply of wire to perform successive welding operations. The advent of this mass use of electric welding wire has caused tremendous research and development in improving the packaging for the bulk welding wire. A common package is a drum where looped welding wire is deposited in the drum as a wire stack, or body, of wire having a top surface with an outer cylindrical surface against the drum and an inner cylindrical surface defining a central bore. The central bore is often occupied by a cardboard cylindrical core as shown in Cooper U.S. Pat. No. 5,819,934. It is common practice for the drum to have an upper retainer ring that is used in transportation to stabilize the body of welding wire as it settles. This ring, as is shown in Cooper U.S. Pat. No. 5,819,934, remains on the top of the welding wire to push downward by its weight so the wire can be pulled from the body of wire between the core and the ring. Each loop of wire has one turn of built-in twist, so that when it is payed out, the twist introduced by releasing a loop of wire is canceled. Hence, the wire is "twist-free" when it reaches the contact tip of the welding gun. The built-in twist causes the wire to spring up from the top of the stack when unrestrained. The weighted ring prevents wire from springing up due to the built-in twist. As a result, the weight of the ring is important. Heavier rings tend to bend or recast the wire, causing wire to wobble when it exits the contact tip, although they are more effective to prevent tangle. Lighter rings can be easily lifted by the wire during payout, thus losing its contact with the top of the wire stack and, thereby, losing its intended purpose of restraining wire movement at the top of the wire stack. Lighter rings have more propensity of tangle, although producing less wire wobble.

The preferred weight of the ring is dependent on the type of welding wire and the diameter or gauge of the welding wire. As can be appreciated, different materials have different properties and, therefore, can produce a different level of upward springing from the wire coil. In addition, changing the diameter of the welding wire will also change the properties of wire. As can also be appreciated, large diameter wire will have more "memory" than a smaller diameter wire. Memory is a measure of an object's tendency to seek a predetermined shape or configuration. As it pertains to this application, the tendency of the wire to seek its natural cast is greater with larger diameter wires. As a result, the ideal weight of the ring is dependent on a number of factors, including the type of welding wire and the diameter of the welding wire. This, in view of the fact that welding wire comes in many material compositions and diameters, creates a condition that a wide range of ring weights are needed to ideally control the payout or unwinding of the different wires, even if packaged in an identical welding wire package.

In addition to weight, the rigidity of the ring is also a factor. In this respect, if the ring flexes, based on the uneven upward forces produced by the wire coil, the ring can be less effective in the control of the unwinding of the welding wire. As can be appreciated, a flexing condition can be similar to the lifting condition described above, in that if the ring flexes or bends, at least a portion of the ring is misaligned from the ideal ring alignment on the top of the coil. While the ring may still be in contact with some of the coil top, a ring that flexes will not be in full contact and/or will allow the coil top to deform. The greater the amount of flex, the greater the misalignment or deformation. This can also result in an increased tendency of tangling and/or wobbling. Accordingly, some ring designs are preferably rigid designs. However, creating a rigid ring often requires either the use of complex and difficult-to-manufacture ring designs and/or the use of additional material which worsens the problem of controlling ring weight.

As can be appreciated from the above, one of the pitfalls of the weighted ring design is the difficulty of striking a balance of less tangle and less wire wobble. Tangles are detrimental to the operation of the package, since they cause downtime of the robotic welding station. Wobble is also detrimental to the operation of the package and can also adversely affect the weld itself by changing the condition of the wire flow through the welding torch. Tangles are caused by many adverse movements of the wire loops on top of the wire stack. The wire has a winding cast that can snap around the outside of the retainer ring, or the wire can bunch and slip at the inside of the retainer ring. The most common tangle is caused as wire is pulled from the inside of the ring and is referred to as "e-script" because of its shape. An e-script tangle stops operation of the welder and must be removed.

STATEMENT OF INVENTION

In accordance with the present invention, provided is a retainer ring for use in connection with a wide range of welding wire coiled in a welding wire package.

More particularly, provided is a ring for use in a welding wire package having a coil of welding wire positioned in a coil receiving cavity in the package. The coil extends about a vertically extending coil axis and has a coil bottom, an oppositely facing coil top, a radially extending outer cylindrical surface, and a radially inner cylindrical surface. The retainer ring is formed from a ring that can be an annular ring body extending about a ring axis with an outer peripheral edge, an inner peripheral edge, a top and a bottom. The ring body can be configured such that the ring body bottom rests on the coil top and the outer peripheral edge is sized to allow the ring to descend within the wire receiving cavity as the wire is unwound from the wire coil. The ring body further includes a thickness between the top surface and the bottom surface such that the ring body has a body density determined, at least in part, by the material used to create the ring. The ring body further includes a plurality of upwardly opened pockets each having a pocket depth less than the thickness of the ring body. The pockets have a density less than the ring density and are sized to control the weight of the ring.

BRIEF DESCRIPTION OF DRAWINGS

The foregoing and more will, in part, be obvious and, in part, be pointed out more fully hereinafter in conjunction with a written description of preferred embodiments of the present invention illustrated in the accompanying drawings in which.

DESCRIPTION OF REFERRED EMBODIMENTS

Referring now in greater detail to the drawings, wherein the showings are for the purpose of illustrating preferred embodiments of the invention only and not for the purpose of limiting the invention, FIGS. 1-5 show a retainer ring 10 having a ring body 12. Ring body 12 includes an outer peripheral edge 16, which can be circular or can include projecting lobes (not shown) for maintaining the retainer ring in proper alignment, which will be discussed in greater detail below. Ring body 12 further includes an inner edge 18, wherein ring body 12 extends between outer peripheral edge 16 and inner edge 18, such that the ring body is an annual ring body.

Figure 1:
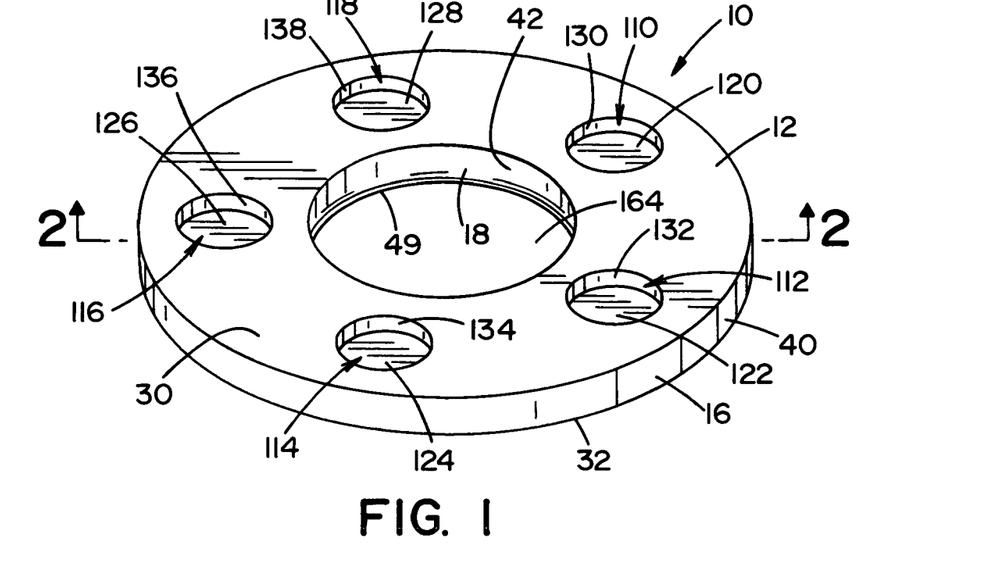
FIG. 1 is a perspective view of a retainer ring according to the present invention.
Figure 2:
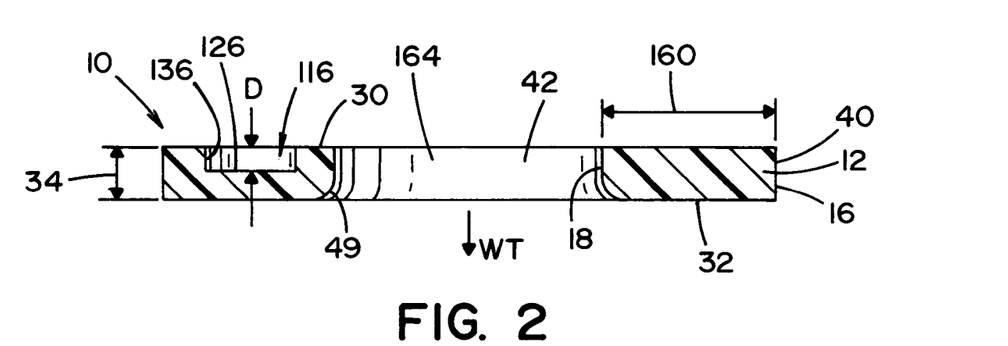
FIG. 2 is a sectional view taken along line 2-2 in FIG. 1.

Ring body 12 further include a top surface 30 and a bottom surface 32 that are spaced from one another forming a thickness 34. While thickness 34 is shown to be a uniform thickness about body 12, it can also vary, such as top surface 30 can have arcuate portions relative to surface bottom surface 32. As a result of having a thickness, outer peripheral edge 16 can have an outer surface 40, and inner edge 18 can form an inner surface 42. In order to improve the function of the ring, retainer ring 10 can include configurations known in the art to control the unwinding of a welding wire 46 from a wire welding package 48. As stated above, outer edge 16 can include projecting lobes to control the descent of retainer ring 10 in wire receiving cavity 50 of package 48. Further, inner edge 18 can include a smooth, curved edge portion 49 to further help control the unwinding of wire 46 from a wire coil 52 and to help prevent damage to the wire during the unwinding.

Figure 3:
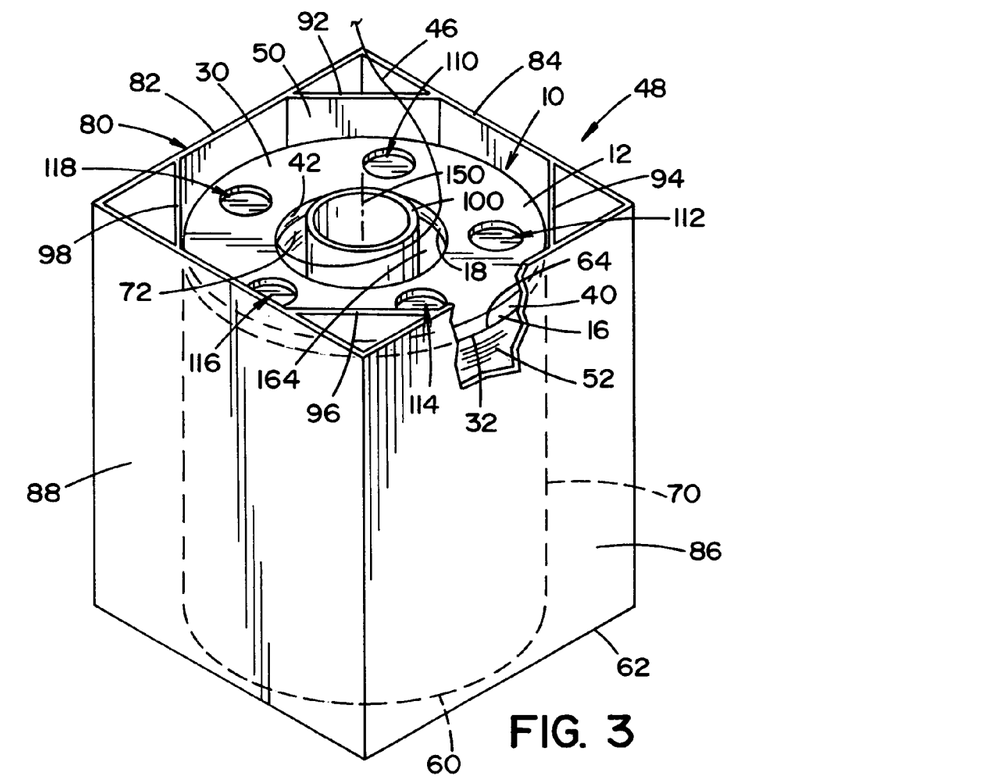
FIG. 3 is a side perspective view of a welding wire package including the ring shown in FIG. 1.
Figure 5:
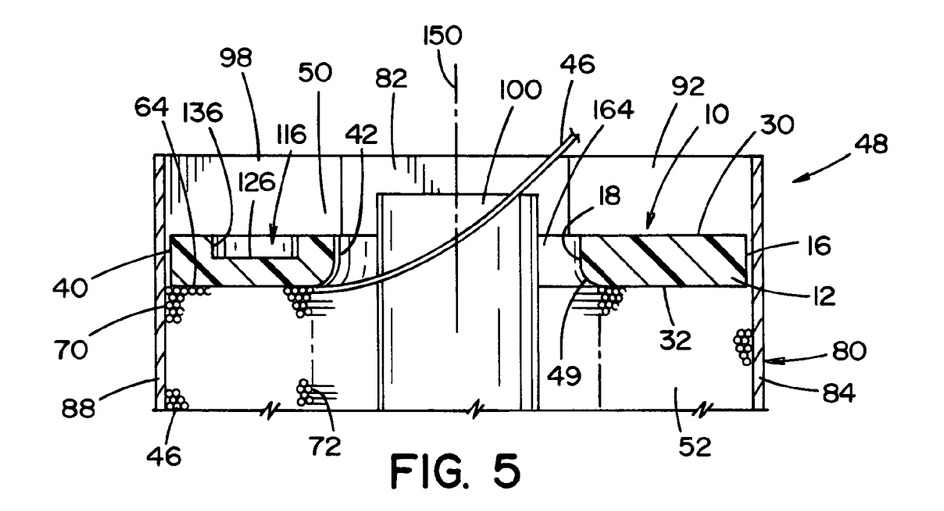
FIG. 5 is an enlarged, partially sectioned view taken along line 5-5 in FIG. 4.

In greater detail, wire package 48 includes wire coil 52 positioned in a wire receiving cavity 50. Wire coil 52 can be any coil known in the art wound by any known winding techniques in the art and can include a coil bottom 60 positioned on a package bottom 62 and an oppositely facing coil top 64. Wire coil 52 further includes a cylindrical outer surface 70 and a cylindrical inner surface 72. Both cylindrical surfaces 70 and 72 extend between coil bottom 60 and coil top 64. Due to the method in which the wire welding is wound into package 48, the individual convolutions of wire 46 can have a natural cast which produces a radial outwardly force in the coil and an upward springing force in the coil. The upward springing force is maintained and controlled by retainer ring 10, which will be discussed in greater detail below. The radial outward force of the coil is controlled, at least in part, by an outer package 80 of wire packaging 48.

Figure 4:
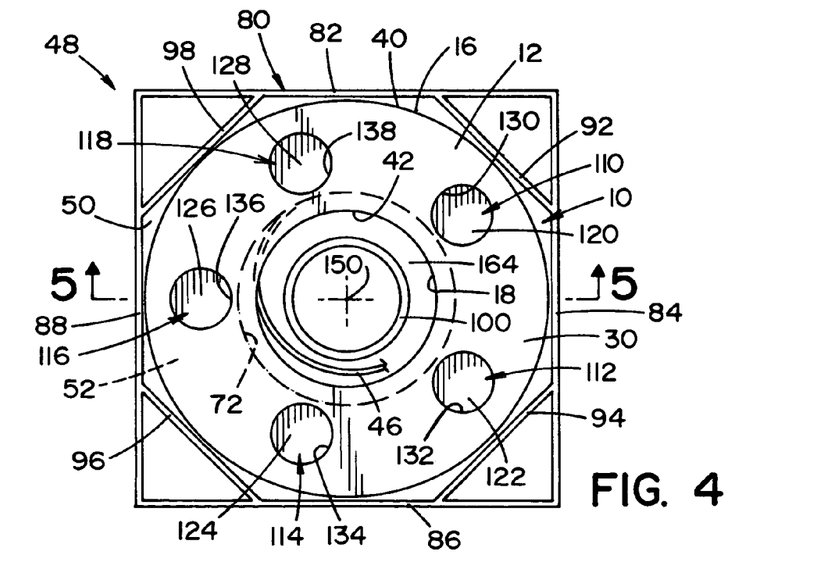
FIG. 4 is a top plan view of the welding wire package shown in FIG. 3.

Outer package 80 can be any known packaging configuration known in the art, including the square configuration as shown, that includes vertically extending sidewalls 82, 84, 86 and 88. Outer package 80 can further include corner supports 92, 94, 96 and 98 positioned in the corners of package 80. While not shown, package 48 can also include inner packaging components, such as a vertically extending liner, vapor barriers, hold-down mechanisms, or any other welding wire packaging components known in the art. Further, package 48 can include a central tubular core 100 to further help the unwinding of the wire from the wire coil. Outer package 80 could also be a drum-style container or other configuration known in the art.

Retainer ring body 12 can be made from a wide variety of materials, including, but not limited to, metal, aluminum and plastic. As can be appreciated, by increasing thickness 34 of the ring body 12, ring body 12 can be a rigid ring which prevents deflection or distortion of the ring body during the operation of the unwinding of the welding wire from the wire coil. Ring body 12 further includes upwardly opened ring pockets or recesses 110, 112, 114, 116 and 118. While five ring pockets are shown, ring body 12 can include a different number of pockets. In this respect, ring body 12 can include, for example, one ring pocket, two ring pockets, three ring pockets, four ring pockets, six ring pockets, seven ring pockets, eight ring pockets, and can include even nine or more ring pockets. Further, as will be discussed in greater detail below, the ring pockets can have a number of different pocket configurations and depths without detracting from the invention of this application.

The ring pockets are utilized to reduce a weight WT of ring body 12 to allow retainer ring 10 to be used in connection with a wide range of welding wire. More particularly, utilizing ring pockets 110, 112, 114, 116 and 118, and/or other combinations of ring pockets allows a single manufactured retainer ring to be used in connection with a wide range of welding wires. As is stated above, welding wires can be made from a number of different materials and can also be made in a number of different wire diameters or gauges. As a result, the wire coil will have different properties based on the material composition of the wire and the wire diameter of the particular welding wire. One of these properties is the amount of upward springing effect produced by the welding wire that is wound into the welding wire package. The use of the ring pockets allows a single ring to be manufactured based on the largest weight component deemed to be appropriate for all types of welding wire in a desired range of welding wires. Then, the weight can be reduced to allow the use of retainer ring 10 on the welding wire coils that need a lighter ring. As is stated above, when a ring is too heavy, it can adversely affect the natural cast of the welding wire, which can cause a wobbling effect in the welding process. However, if a retainer ring is too light, it can be ineffective in controlling the unwinding of the welding wire, thereby allowing a tangle to be formed. By utilizing the pocket technique described in this application, the ring body weight WT can be precisely adjusted without major modification to the ring body and without affecting the rigidity of the ring body. As a result, a single ring design can be made based on a particular package design and/or size and, then, can be adjusted based on the wire wound into the particular package.

As can be appreciated, based on the amount of weight that needs to be removed, the number of ring pockets can be adjusted as, with the size of the ring pockets. In this respect, the greater the amount of weight or mass that needs to be removed can be addressed by changing the number of pockets, the configuration of the pockets and/or the depth of the pockets. Further, the pocket configurations and/or depths can also be dictated by the preferred and/or available material removal techniques of the person(s) responsible for adjusting the weight. This can include, but is not limited to, adjusting the weight at the time of the winding of the wire and adjusting the weight at the time of the unwinding of the wire.

The weight removed from ring 10 is a function of the material removed from the ring and the fact that the volume of the pocket, after the material removal, has a density or weight that is less than that of the same volume before the material removal. As can be appreciated, the air that occupies an opened pocket is less dense than the material that was removed from the ring and, therefore, has less resulting weight which results in a reduction of WT. As will be discussed in greater detail below, the pockets can also be filled, or partially filled, with a material that is less dense than the ring material.

As stated above, while the ring pockets are shown to be cylindrical pockets, they can include other configurations without detracting from the invention of this application. However, as can be appreciated, the use of an end mill or similar machining device tends to produce a cylindrical pocket and this type of material removal is easy and effective. Pockets 110, 112, 114, 116 and 118 shown in FIGS. 1-4 have bases 120, 122, 124, 126 and 128, respectively, and a sidewall 130, 132, 134, 136 and 138. Further, the pockets have depth D, based on the amount of weight that needs to be removed from the retainer ring.

Pockets 110, 112, 114, 116 and 118 can be circumferentially spaced about a ring axis 150 such that all are equidistant from package axis 150. Further, to evenly remove weight from the ring body, the rings can be equally circumferentially spaced about axis 150. In addition, the depth of the pockets can be different from one to the next, which can at least in part be used to balance the ring if it is determined that the ring, without pockets, is unbalanced.

Ring body 12 further includes a ring width 160 that is defined by the distance between inner edge 18 and outer edge 16. As can be seen, ring width 160 can vary from the top portion of the ring to the bottom portion of the ring if curved portion 49 it utilized. While it is preferred that the pockets extend only partially through the ring body, the pockets can be an opening extending entirely through the ring body. While this can maximize the weight reducing effect of the whole based on a given diameter cutting tool, piercing the bottom surface of the ring body can affect the unwinding of the wire from the coil in that bottom surface 32 of the ring engages the top of the coil. As is shown, the inner edge can have a diameter that is less than the diameter of cylindrical inner surface 72 such that ring body 12 hangs over the inner portion of the coil. This configuration has been found to improve the unwinding of the wire coil.

In operation, the welding wire is removed from underneath ring body 12 and passes through central opening 164 of the ring body which is defined by inner edge 18. As the welding wire is removed from the coil, the portion of the out flowing welding wire that engages the ring body moves about package axis 150 as each convolution of wire is removed from the coil. In order to prevent one convolution of welding wire from engaging another convolution of welding-wire, welding wire package 48 can include core 100, which can be any known core in the art. As the welding wire is removed from the coil, coil 52 also becomes shorter and shorter, wherein coil top 64 descends within coil receiving cavity 50. As a result, retainer ring 10 is configured to descend with the unwinding of the welding wire from the wire coil. To achieve this result, outer peripheral edge 16 is sized to allow the ring to generally freely descend within the wire cavity as the wire is removed. However, the retainer ring must also prevent convolutions of welding wire from popping up about the outer edge of the retainer ring. As can be appreciated, a ring that is configured to remove the welding wire through central opening 164 should be designed to prevent the wire from popping up or springing up about the outer peripheral edge of the retainer ring. This condition can adversely affect the flow of wire towards the central opening. As a result, retainer ring 10 should be sized to prevent such outward popping of the welding wire. This can include (while not shown) outwardly extending lobes in the outer edge of the retainer ring. These can be used to produce engagement points with the inner surface of the outer packaging or to extend over gaps between the coil and the packaging when polygonal packaging configurations are used, such as the square packaging shown in this application. Again, this application is not to be limited to any peripheral edge configuration, and it is also not to be limited to a particular outer packaging configuration.

In the remaining discussion concerning other embodiments of this application, common components will be referenced with common reference numbers as discussed above.

Figure 6:
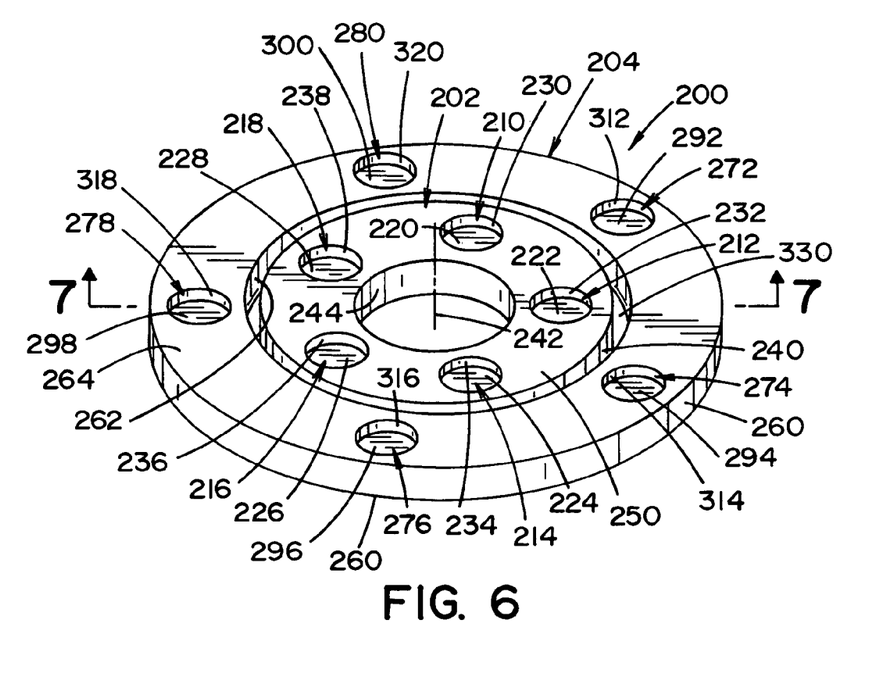
FIG. 6 is a perspective view of another embodiment of the retainer ring according to the present invention.
Figure 7:
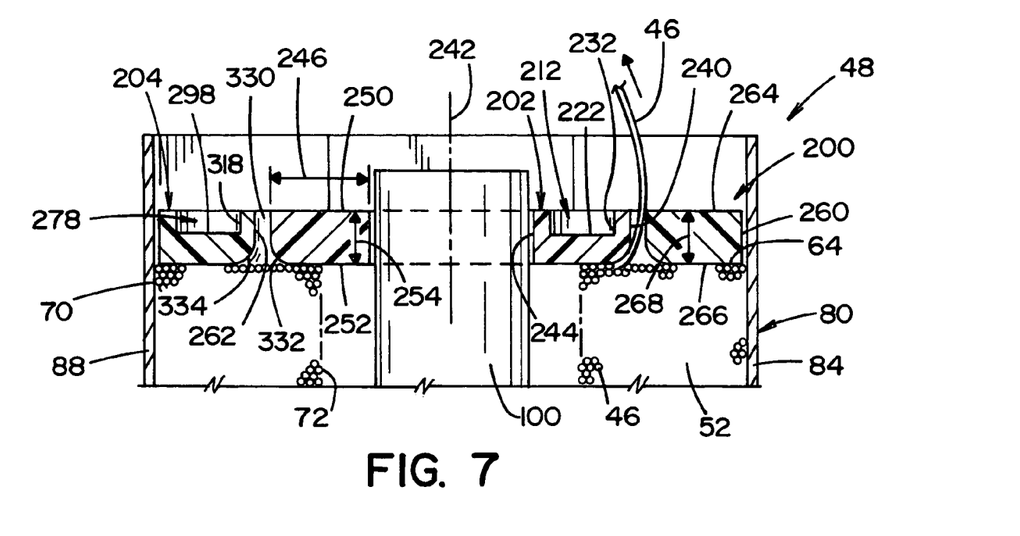
FIG. 7 is a sectional view taken along line 7-7 in FIG. 6.

With references to FIGS. 6 and 7, yet another embodiment is shown. In this respect, retainer ring 200 includes a ring body 202 and a ring body 204, which work in unison to control the unwinding of the welding wire from the wire package.

Figure 8:
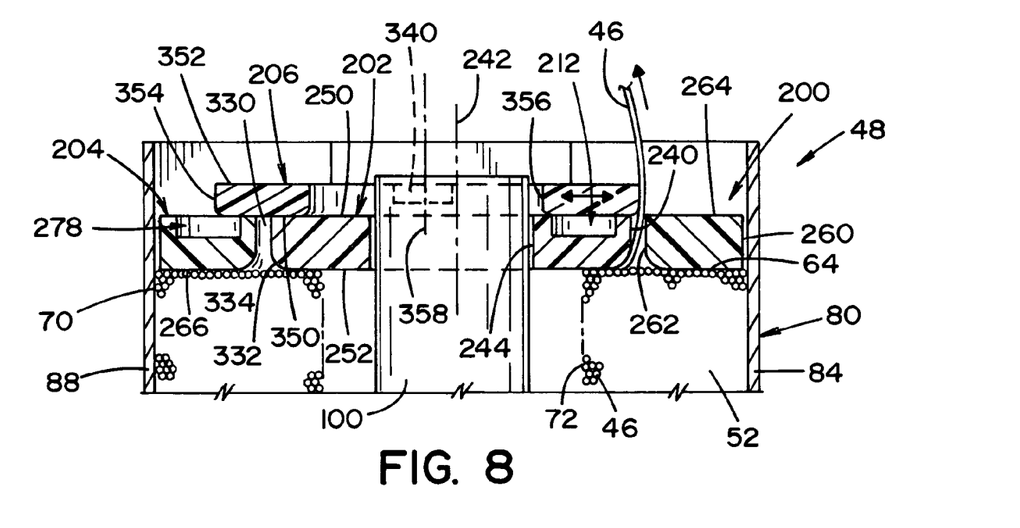
FIG. 8 is a sectional view shown in FIG. 7 wherein yet another embodiment is shown which includes a third ring.

It has been found that in certain welding wire unwinding applications, a multi-ring configuration has advantages over a single ring configuration. Retainer ring 200 is such a multi-ring configuration which includes ring bodies 202 and 204. As is shown in FIG. 8 retainer ring 200 can further include a third ring body 206. While ring bodies 202, 204 and 206 are sized differently than ring body 12 discussed above, they can include similar features of the ring body discussed above. In this respect, at least one of ring bodies 202, 204 and 206 can include weight reducing pockets to control the weight of the retainer ring based on the type of welding wire in the wire package.

With respect to ring 202, it can include ring pockets 210, 212, 214, 216 and 218 that can have pocket bases 220, 222, 224, 226 and 228, respectively, and ring sides 230, 232, 234, 236 and 238. Ring 202 further includes an outer peripheral edge 240 extending about a ring axis 242. Further, ring 202 includes an inner edge 244 spaced inwardly from outer edge 240 wherein ring 202 has a radial width 246 than can also vary if a curved wire guiding edge is utilized. Ring 202 further includes a top surface 250 and a bottom surface 252. As with ring body 12 described above, at least one of the edges 244 and 240 can include a curved or smoothened guiding surface. Ring 202 further includes a thickness 254, defined by the space between top surface 250 and bottom surface 252. Again, thickness 254 does not need to be a uniform thickness about the entire ring body.

Retainer ring 204 includes an outer peripheral edge 260 and an inner edge 262. Ring body 204 further includes a top surface 264 and an oppositely facing bottom surface 266. Top and bottom surfaces 264 and 266, respectively, are spaced from one another such that ring body 204 includes a thickness 268. In this particular embodiment, thickness 268 of ring body 204 can be equal to thickness 254 of ring body 202; however, that is not a requirement for the invention of this application. Further the thickness does not need to be uniform. Ring body 204 further includes ring pockets 272, 274, 276, 278 and 280. As with the previously discussed pockets, pockets 272, 274, 276, 278 and 280 are generally cylindrical and include pocket bases 292, 294, 296, 298 and 300, respectively, and pocket sides 312, 314, 316, 318 and 320.

Inner edge 262 of ring body 204 can have a diameter larger than outer edge 240 of ring body 202 to produce an annular gap 330 between the retainer rings. As is shown in FIG. 7, welding wire 46 can be payed out between the retainer rings in this gap. In order to better control the unwinding of the welding wire from the wire coil, ring bodies 202 and 204 can include configurations known in the art. This can include wire guiding curved portions 332 and 334 in surfaces 240 and 262, respectively.

Retainer body 206 can be positioned over top of ring bodies 202 and 204, such that it moves relative to bodies 202 and 204 during the unwinding of the wire. This functions as to at least partially cover annular opening 330 during the payout of the welding wire from the wire coil. By partially covering gap 330, ring 206 helps block any unwanted wire convolutions from spring through the gap during the unwinding. While not required, ring body 206 can also include at least one ring pocket 340 to lighten ring body 206, as discussed above with respect to the other ring bodies. Further, as is discussed above, while a finite number of ring pockets are shown for each ring body, the ring bodies can include more or less ring pockets. Further, one or all of the rings can include the pockets to reduce the weight. As can be appreciated, the desired weight of ring 200 can be an overall weight of all ring bodies. Therefore, the amount of weight that needs to be removed, or adjusted, can affect the number of rings that need pockets. If a large amount of weight needs to be removed, all rings may need to be adjusted. If less weight needs to removed, less than all the rings may need to be adjusted. Further, the adjustment in a multi-ring configuration, may also be to produce a desired relative motion between the rings. In this respect, it can be advantageous to have ring body 206 lightened more than ring bodies 202 and 204 to produce a desired movement in body 206 relative to rings 202 and 204. As will be discussed in greater detail below, ring 206 moves relative to rings 202 and 204 during the unwinding of the wire, and the wire, as it is unwound, drives the motion of ring 206. Therefore, it can be advantageous to more exactly adjust ring 206 than other rings and it can also be an advantage for ring 206 to be easily movable by the wire.

In this respect, ring body 206 has a bottom surface 350 and oppositely facing top surface 352, outer peripheral edge 354 and an inner edge 356. Ring body 206 rests on ring bodies 202 and 204 and moves relative to ring bodies 202 and 204, during the unwinding of the welding wire from the wire coil. More particularly, bottom surface 350 of ring body 206 rests on a portion of top surface 250 of ring body 202 and a portion of top surface 264 of ring body 204. Ring body 206 can be sized such that it partially covers annular gap 330, wherein the movement of the welding wire about axis 242 engages one of outer edge 354 or inner edge 356 to move ring 206 generally about axis 242. Ring 206 also includes a ring axis 358 which is parallel to ring axis 242 but spaced from ring axis 242. Further, ring axis 358, continues to move relative to ring axis 242, while staying parallel thereto, as the wire is unwound.

Figure 9:
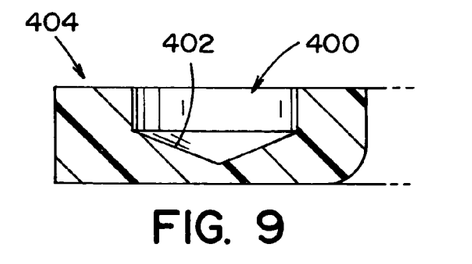
FIG. 9 is an enlarged partial sectional view similar to FIG. 2 which includes another pocket configuration.
Figure 10:
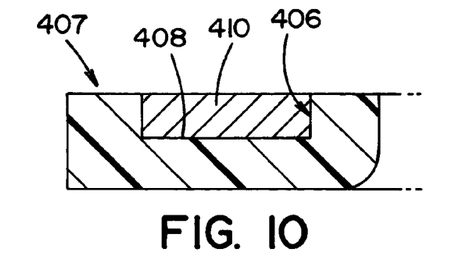
FIG. 10 is an enlarged partial sectional view similar to FIG. 2 which includes yet another pocket configuration having a fill material.
Figure 11:
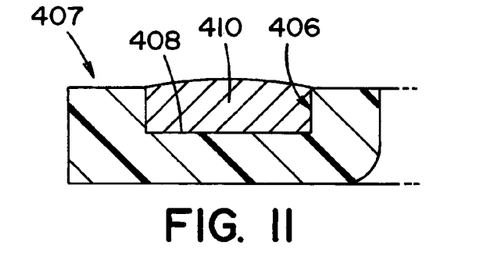
FIG. 11 is an enlarged partial sectional view similar to FIG. 2 which includes a further pocket configuration also having a fill material.

With reference to FIGS. 9-17, shown are examples of different types of ring configurations. As can be appreciated, this showing is not exhaustive, in that a number of ring configurations can be utilized without detracting from the invention of this application. As described above, the many pockets can have a generally cylindrical configuration with a generally flat base. FIG. 9 shows a pocket 400 in a ring 404 that has a non-flat base 402. FIG. 10 shows a pocket 406 in ring 407 which includes a generally flat base 408; however, pocket 406 is filled with a filler material 410 that is less dense than the material of ring 407, thereby generally maintaining the structure and configuration of the ring while allowing the ring to be reduced in weight. Filler 410 can be any filler known in the art including, but not limited to, foaming resins and porous polymers and other polymers. FIG. 11 shows pocket 406 in ring 407 wherein filler 410 has a greater volume than pocket 406. It should be appreciated that filler does not need to exactly fill the pocket. The filler can fill less than the entire pocket and can over fill the pocket as is shown in FIG. 11.

Figure 12:
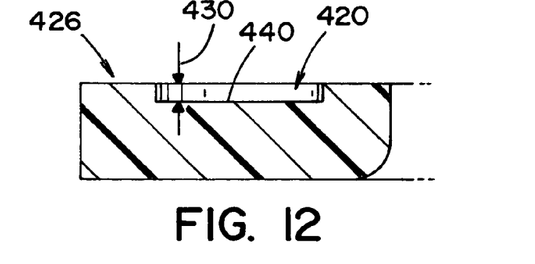
FIG. 12 is an enlarged partial sectional view similar to FIG. 2 which includes even yet another pocket configuration having a shallow depth.
Figure 13:
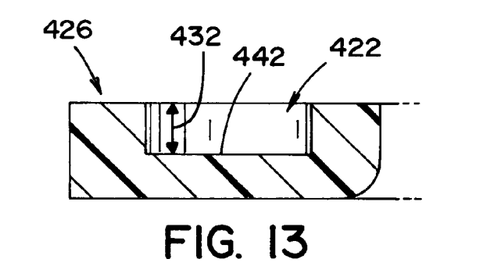
FIG. 13 is an enlarged partial sectional view similar to FIG. 2 which includes another pocket configuration having a medium depth.
Figure 14:
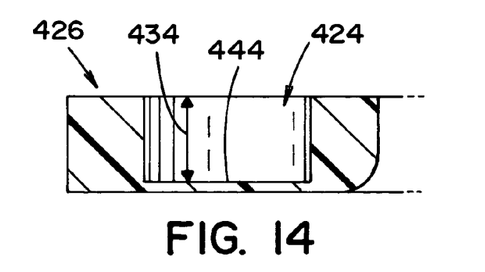
FIG. 14 is an enlarged partial sectional view similar to FIG. 2 which includes yet a further pocket configuration having a deep depth.

With reference to FIGS. 12-14, shown is pockets 420, 422 and 424 that can be in a common ring body 426 or in different ring bodies. These rings show that different amounts of material can be removed to achieve a desired weight reduction in the particular ring body. More particularly, pocket 420 has a depth 430, pocket 422 has a depth 432 and pocket 424 has a depth 434. Each of these depths are different in that 432 is greater than 430, and 434 is greater than both 430 and 432. Further, these pockets, or the others described below, can include a less dense fill material as described above. Pockets 420, 422 and 424 include bases 440, 442 and 444 which are flat bases. However, while these bases are shown to be flat, that is not a requirement for the multi-depth pockets or other pockets of this application.

Figure 15:
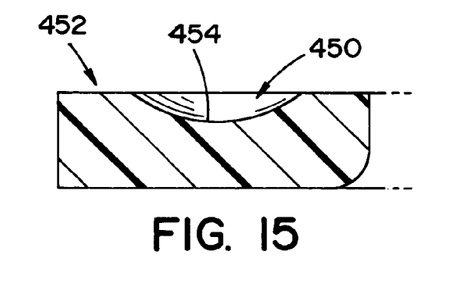
FIG. 15 is an enlarged partial sectional view similar to FIG. 2 which includes even yet a further pocket configuration having a shallow depth.

With reference to FIG. 15, shown is a pocket 450 in ring body 452 having an arcuate base 454. Again, this figure shows another example of the many configurations of pockets that could be used to reduce the weight of the ring according to the present invention.

Figure 16:
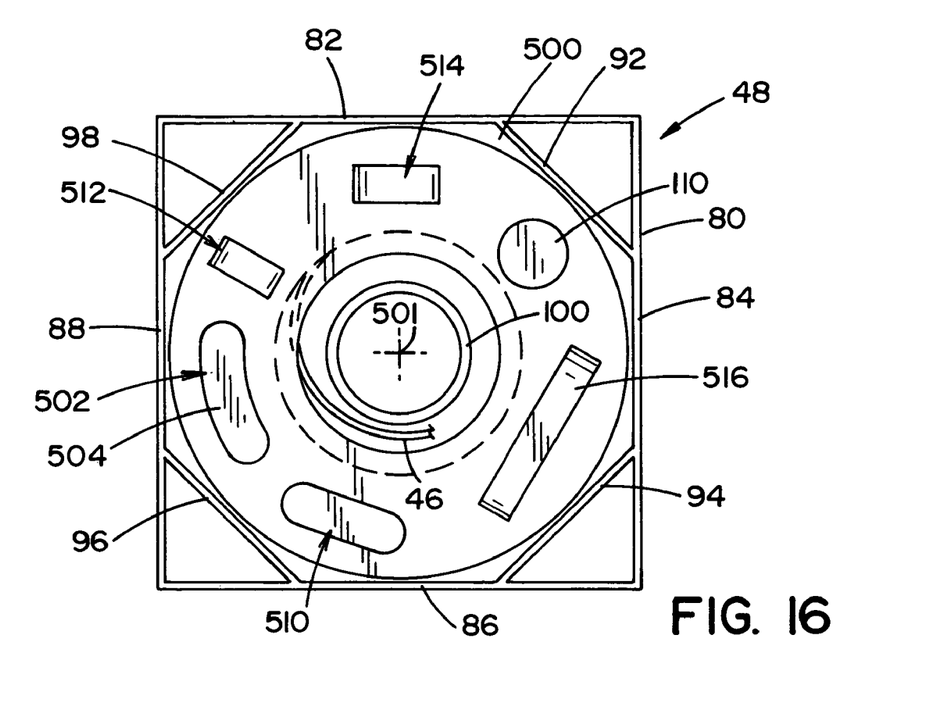
FIG. 16 is a top plan view of another ring according to the present invention including other pocket configurations and showing that multiple pocket configurations can be included in a single ring.
Figure 17:
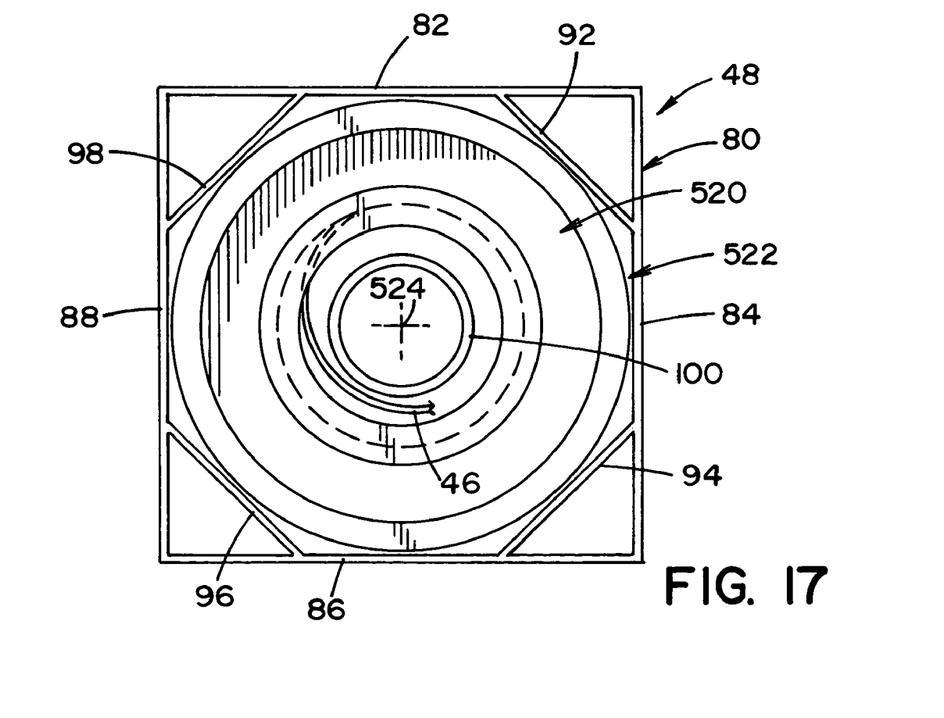
FIG. 17 is a top plan view of another ring according to the present invention including an annular pocket configuration.

With reference to FIGS. 16 and 17, other configurations are shown. In this respect, while the cylindrical pockets described above could be machined using an end mill rotating about an axis fixed relative to the particular ring body, the end mill axis could also be moved relative to the ring body. Shown is a ring body 500 having a ring axis 501. Ring body 500 further includes a pocket 502 that is an elongated pocket extending partially about axis 501. Pocket 502 could be produced by an end mill wherein the axis of the end mill is moved partially about axis 501. The pocket includes a base 504 that could be flat or non-flat without detracting from the invention of this application. Ring body could further include a pocket 510 which is also elongated, however, it extends linearly such as a cord in a circle extending about axis 501.

Pockets 512, 514 and 516 show pockets that are also elongated pockets that could be machined or cut by tools different than an end mill rotating about an axis generally parallel to body axis 501. Any known method of cutting or machining in the art could be used. Pocket 512, 514 and 516 could be formed by a cutter rotating about an axis generally perpendicular to axis 501. As can be appreciated, this pockets could include an arcuate base, such as is shown in FIG. 15. This is more true for pockets 512 and 514. Pocket 516 is sufficiently elongated such that the cutting tools used is moved relative to the ring to elongate that hole. As can be appreciated, moving the cutting tool relative to the ring body can be used to increase the amount of weight removed.

Shown is FIG. 17 is an elongated pocket 520 in ring 522. Pocket 522 extends about a ring axis 524 forming an annular ring pocket. As can be appreciated, more than one annular pocket could be used, and the size of the pocket could be varied.

In addition, while not discussed in detail, any of the embodiments above of this invention can include other mechanisms known in the art, such as hold-down mechanisms which are utilized to secure the wire coil during the transport of the package. Further, additional package configurations, such as drum style packaging can be utilized without detracting from the invention of this application. Further, coil protectors, such as vapor barriers can also be used to help protect the welding wire from adverse environments such as during the transport of the container by ship across the ocean. Accordingly, as is stated above, while only one packaging design was discussed in relation to the invention of this application, the invention of this application should not be limited to this configuration.

Figure 18:
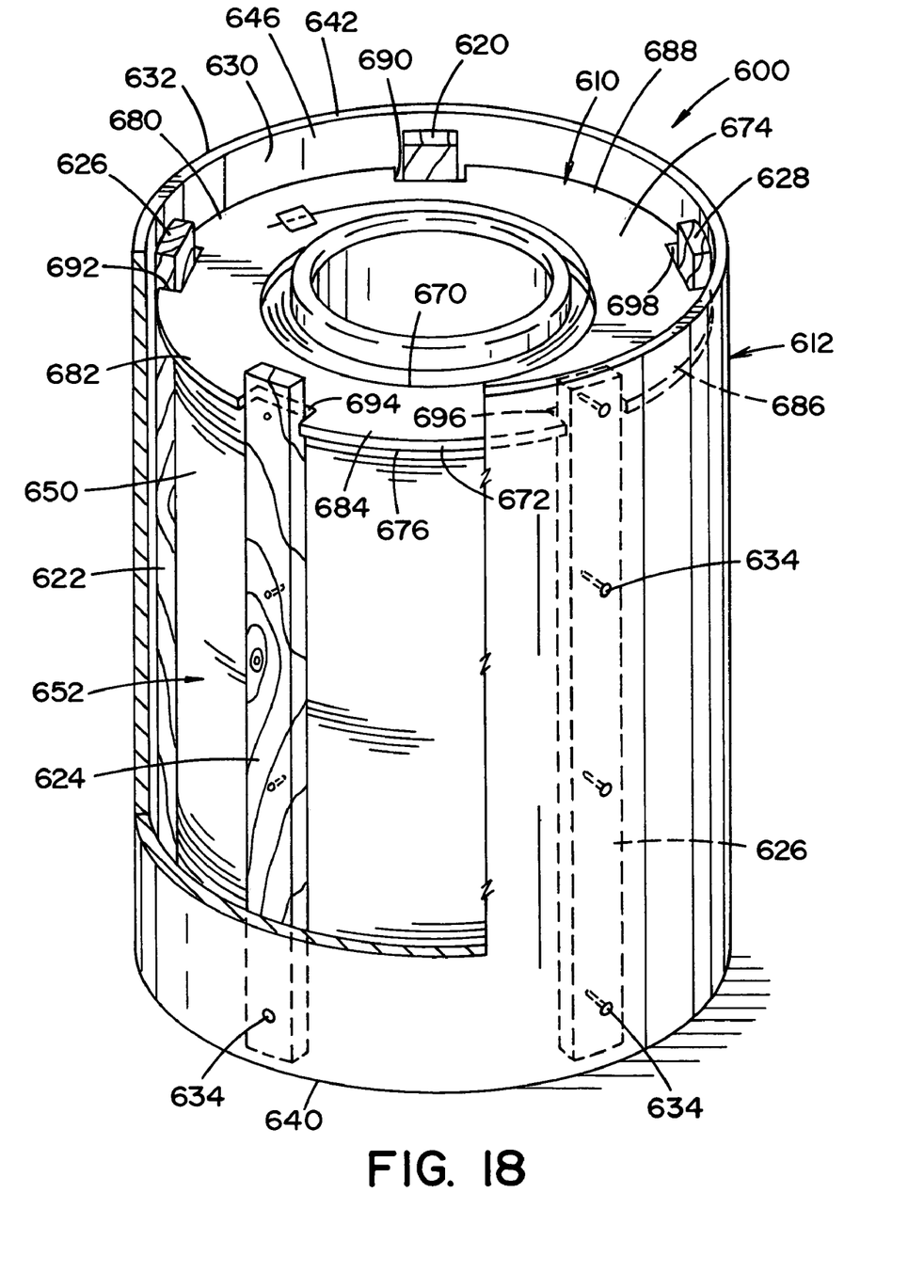
FIG. 18 is a perspective view of yet another embodiment of the retainer ring according to the present invention which is configured for a ribbed package.
Figure 19:
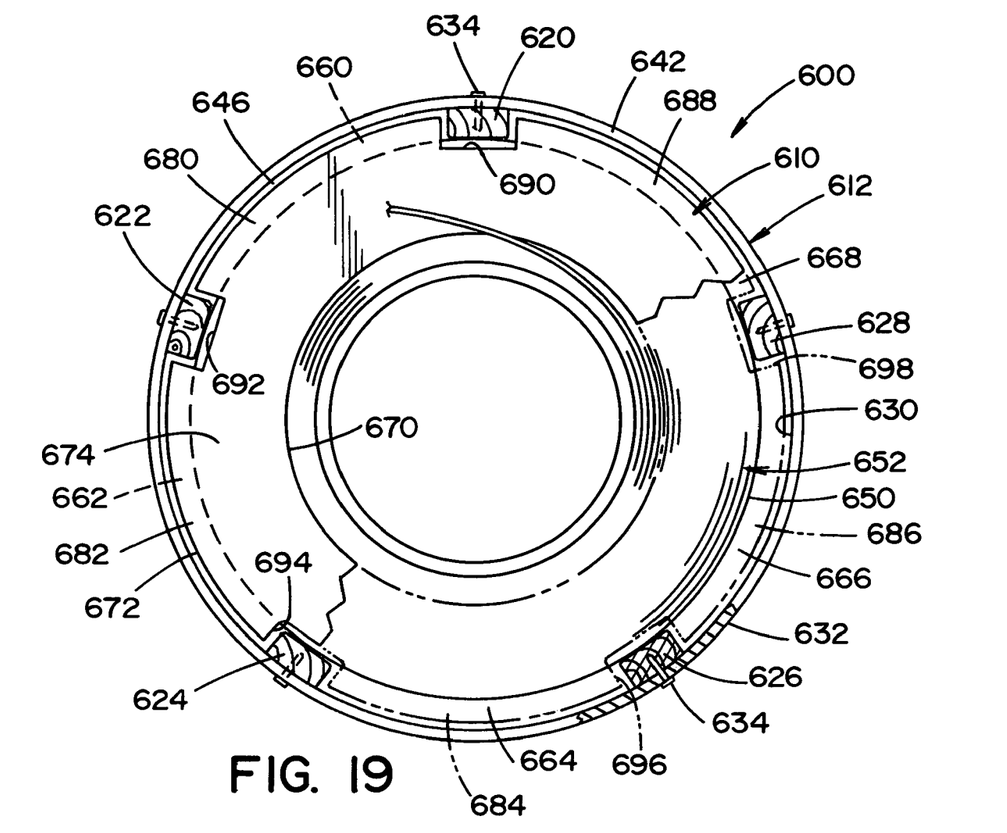
FIG. 19 is a top plan view of the package and ring shown in FIG. 18.
Figure 20:
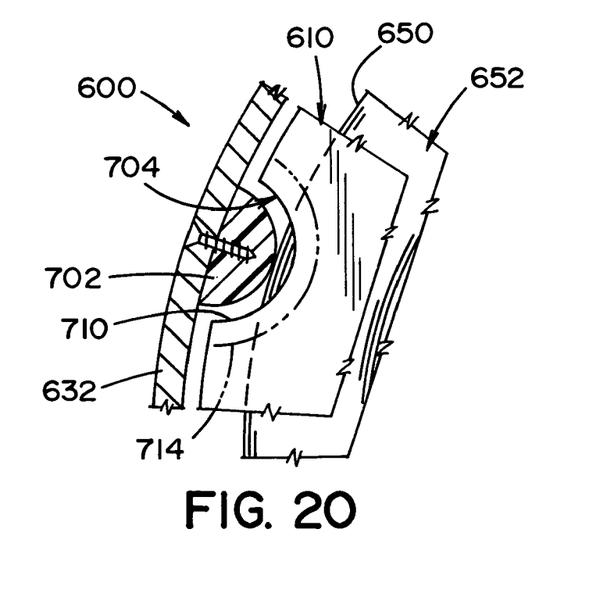
FIG. 20 is an enlarged view of one of the ribs shown in FIG. 18.

With reference to FIGS. 18-20, shown is welding wire package 600 which includes a retainer ring 610 and a ribbed package 612. As can be appreciated, and as is discussed above, while a cylindrical package is shown, this embodiment, as with the other embodiments of this application, can be practiced on a wide range of welding wire packages without detracting from the invention of this application. For example, this embodiment of the invention can utilize a square package configuration. Further, while a flat annular ring is shown, this embodiment, and the others described above, can be a wide variety of ring configurations without detracting from the invention of this application.

Ribbed package 612 includes vertically extending ribs 620, 622, 624, 626 and 628. While five ribs are shown, more or less ribs could be utilized. Ribs 620, 622, 624, 626 and 628 are fixed relative to an inner surface 630 of an outer wall 632 by any known method in the art. This can include, for example, nail like fasteners 634 shown, other fasteners known in the art, frictional engagement, or even adhesives. Package 612 includes a bottom 640 wherein wall 632 extends from bottom 640 to a top edge 642 that defines a top opening 646. Ribs 620, 622, 624, 626 and 628 can generally extend from at or near bottom 640 to at or near top edge 642 such that an outer coil surface 650 of a wire coil 652 is supported laterally by the ribs. As a result, gaps 660, 662, 664, 666 and 668 are formed between coil surface 650 and inner surface 630 of the packaging.

Ring 610 includes an inner edge 670 and an outer edge 672 with an upper surface 674 and an oppositely facing bottom surface 676 that can extend between edges 670 and 672. Ring 610 further includes projections or extensions 680, 682, 684, 686 and 688 and edge pockets 690, 692, 694, 696 and 698 between the projections. Again, more or less extensions could be utilized without detracting from the invention of this application. The combination of projections 680, 682, 684, 686 and 688 and edge pockets 690, 692, 694, 696 and 698 allow the ring to extend beyond the outer surface of the wire coil to prevent convolutions of the wire coil from springing up about the outside edge of the ring. In this respect, the edge pockets are configured to fit about a respective one of the ribs in the package and the extension are to extend between a respective rib. While only two rib configuration and pocket configurations are shown, the pockets and ribs can be any one of a number of configurations without detracting from the invention of this application. Further, the ribs can be a separated component, such as, but not limited to, a sheet material that includes the ribs that is position in the package. Again, Barton U.S. Pat. No. 6,913,145 is incorporated by reference herein wherein some of these other configurations are described in greater detail.

The weight of ring 610 can be controlled by the methods described above with respect to other embodiments of this application. Further, the weight of ring 610 also can be controlled by the size of the edge pockets. In this respect, the ring can be produced with the smallest size needed for clearance, a desire size larger than the minimum size or even without edge pockets. Then, the ring pockets can be created or resized to produce the desired weight of the ring based on the welding wire utilized and the welding wire package configuration.

As can be appreciated, while the edge pockets and the ribs are shown to be of similar configuration, that is not required in that the ribs and pockets can have different configurations as long as the ring can move downwardly in the wire package as the wire is payed out. Further, it is preferred, but not required, that projections 680, 682, 684, 686 and 688 extend outwardly of outer coil surface 650. As is shown in FIG. 20, package 600 includes a rib 702 extending inwardly from wall 632. Ring 610 includes a ring pocket 704 with a pocket edge 710 that is closely configured to rib 702. To reduce the weight of ring, ring pocket 704 (and/or the other ring pockets) can be reshaped such as it can be resized to form an edge 714 such that the ring 610 is lighter. As with all embodiments of this application, the reshaping or resizing of the pockets can be of one pocket, or pockets or any combination of pockets. Further, the reshaping or resizing of the pockets does not have to be uniform for each pocket. For example, the resizing can very one pocket to the next to help balance the ring which can be in addition to changing the weight of the ring.

In even yet another embodiment, one or more of the pockets can be filled, partially filled an/or over filled, with a material having a density greater than the density of the material used to produce the ring to make the ring heavier and/or to help balance the ring.

While considerable emphasis has been placed on the preferred embodiments of the invention illustrated and described herein, it will be appreciated that other embodiments and/or equivalents thereof can be made, and that many changes can be made in the preferred embodiments without departing from the principles of the invention. Accordingly, it is to be distinctly understood that the foregoing descriptive matter is to be interpreted merely as illustrative of the invention and not as a limitation.

Having thus defined the invention, the following is claimed:

1. A retainer ring for use in a welding wire package, the package having a coil of welding wire positioned in a coil receiving cavity in the package and extending about a vertically extending coil axis, the coil further including a coil bottom and an oppositely facing coil top, a radially extending outer cylindrical surface extending between the coil bottom and the coil top and a radially inner cylindrical surface extending between the coil bottom and the coil top, said ring comprising an annular ring body extending about a ring axis with an outer peripheral edge and an inner peripheral edge, said ring body comprising a top surface extending between said outer and inner peripheral edges and an oppositely facing bottom surface extending between said outer and inner peripheral edges, said bottom surface being configured to rest on the coil top and said outer peripheral edge being sized to allow said ring to descend within the wire receiving cavity as the wire is unwound from the wire coil, said ring body further including a thickness between said top surface and said bottom surface and said body being comprised of a material composition having a ring body density, said ring body further including at least one upwardly opened pocket having a base surface spaced above said bottom ring surface defining a pocket depth that is less than said thickness of said ring body and at least one side wall extending about said base defining a pocket perimeter, said pocket depth and perimeter defining a pocket volume, said pocket volume having a pocket density less than said ring body density.

2. The retainer ring as defined in claim 1, wherein said outer peripheral edge and said inner peripheral edge are coaxial with said ring axis and said at least one pocket is a plurality of pockets spaced from said inner peripheral edge and said outer peripheral edge and circumferentially spaced about said ring axis.

3. The retainer ring as defined in claim 1, wherein said outer peripheral edge and said inner peripheral edge are coaxial with said ring axis and said at least one pocket is a plurality of pockets spaced from said inner peripheral edge and said outer peripheral edge and circumferentially spaced equally about said ring axis.

4. The retainer ring as defined in claim 1, wherein the radial distance between said outer peripheral edge and said inner peripheral edge is a ring body width, said at least one pocket having a maximum radial width defined by said at least one pocket side wall and said maximum radial width being less than said ring body width, said at least one pocket being spaced from said inner peripheral edge and said outer peripheral edge.

5. The retainer ring as defined in claim 4, wherein said each maximum radial width is less than eighty percent of said ring body width.

6. The retainer ring as defined in claim 4, wherein said each maximum radial width is less than fifty percent of said ring body width.

7. The retainer ring as defined in claim 4, wherein said each maximum radial width is less than thirty percent of said ring body width.

8. The retainer ring as defined in claim 1, wherein said at least one pocket is at least 3 pockets.

9. The retainer ring as defined in claim 1, wherein said at least one pocket is at least 4 pockets.

10. The retainer ring as defined in claim 1, wherein said at least one pocket includes an elongated pocket extending at least partially about said ring axis, said elongated pocket being spaced from said inner peripheral edge and said outer peripheral edge of said ring.

11. The retainer ring as defined in claim 1, wherein said ring is made from metal.

12. The retainer ring as defined in claim 1, wherein said ring is made from aluminum.

13. The retainer ring as defined in claim 1, wherein said at least one pocket is at least partially filled with a non-gaseous filler material having a filler material density less than said ring body density.

14. The retainer ring as defined in claim 1, wherein said ring body is a first ring body, said outer peripheral edge being a first outer peripheral edge and said inner peripheral edge being a first inner peripheral edge, said at least one pocket is a first set of at least one pockets, said retainer ring further including a second ring body, said second ring body having a second outer peripheral edge and a second inner peripheral edge, said second outer peripheral edge having a diameter less than a diameter of said first inner edge such that said second ring body is positionable adjacent to said first ring body on the coil top and said retainer ring includes an annular gap between said first and second ring bodies, said second ring body having a second set of at least one pockets, said second set of at least one pockets being between said second outer peripheral edge and said second inner peripheral edge.

15. The retainer ring as defined in claim 14, wherein at least one of said first and second sets of at least one pockets is a plurality of pockets circumferentially spaced about said ring axis.

16. The retainer ring as defined in claim 14, wherein at least one of said first and second sets of at least one pockets is a plurality of pockets circumferentially spaced equally about said ring axis.

17. The retainer ring as defined in claim 14, wherein said first and second ring bodies are made from metal.

18. The retainer ring as defined in claim 14, wherein said first and second ring bodies are made from aluminum.

19. The retainer ring as defined in claim 14, further including a third ring body, said third ring body having a third outer peripheral edge and a third inner peripheral edge, said third ring body having a third ring body bottom surface and an oppositely facing third ring body top surface, said third ring body being positioned on top of said first and second ring bodies and partially covering said annular gap between said first and second ring bodies, said third ring body moving relative to said first and second ring bodies during the unwinding of the wire from the wire coil.

20. The retainer ring as defined in claim 19, wherein said third ring body includes a third set of at least one pockets.

21. The retainer ring as defined in claim 1, wherein said ring body is rigid.

22. The retainer ring as defined in claim 1, wherein said thickness of said ring body is generally uniform.

23. The retainer ring as defined in claim 1, wherein said thickness of said ring body is not uniform.

24. A welding wire package comprising an outer packaging with a central axis, a wire coil in said packaging coaxial with the packaging axis, said wire coil having a coil top and an oppositely facing coil bottom surface, and an outer cylindrical surface, said package further including a retainer ring having a ring body with a top surface and a bottom surface, said top and bottom surface being spaced from one another such that said ring body has a thickness, said ring further including an inner edge defining a central opening and an outer peripheral edge spaced from said inner edge, said bottom surface of said ring resting on said coil top, said retainer ring allowing welding wire to be payed from under said retainer ring upwardly from said coil through said central opening and said ring descending within said outer packaging as said wire is removed from said package, said ring being comprised of a material composition having a ring body density, said ring further including at least one upwardly opened pocket having a base surface spaced above said bottom surface of said ring defining a pocket depth and a pocket perimeter extending about said base surface, said pocket depth and perimeter defining a pocket volume, said pocket volume having a pocket density less than said ring density.

25. The welding wire package as defined in claim 24, wherein said at least one pocket is a plurality of pockets circumferentially spaced about said ring axis and spaced from said inner edge and said outer peripheral edge.

26. The welding wire package as defined in claim 24, wherein said at least one pocket is at least three pockets.

27. The welding wire package as defined in claim 24, wherein said at least one pocket is at least four pockets.

28. The welding wire package as defined in claim 24, wherein said inner peripheral edge of said ring body extends inwardly of the radially inner cylindrical surface of the coil.

29. The welding wire package as defined in claim 24, wherein said thickness of said ring body is generally uniform.

30. The welding wire package defined in claim 24, wherein said at least one pocket is at least partially filled with a non-gaseous filler material having a filler material density less than said ring body density.

31. A method of controlling the payout of wire from a welding wire package wherein the package includes an outer packaging with a central axis, a wire coil in said packaging coaxial with the packaging axis, said wire coil having a coil top and an oppositely facing coil bottom surface, and an outer cylindrical surface, said method comprising the steps of:
providing a retainer ring having a ring body with a top surface and a bottom surface, said top and bottom surface being spaced from one another such that said ring body has a thickness, said bottom surface of said ring being configured to rest on said coil top, said retainer ring allowing welding wire to be payed from under said retainer ring upwardly from said coil, said ring being comprised of a material composition having a ring body density; and,
removing a portion of said material composition from said ring body to produce at least one ring pocket in said ring, said at least one ring pocking having a pocket base spaced above said bottom surface of said ring and defining a pocket depth and having a pocket side defining a pocket perimeter, said pocket depth and perimeter defining a pocket volume, said pocket volume having a pocket density less than said ring density.

32. The method as defined in claim 31, wherein said retainer ring further includes an inner peripheral edge and an outer peripheral edge, said at least one ring pocket being formed between said inner peripheral edge and said outer peripheral edge.

33. The method as defined in claim 31, further including the step of at least partially filling said at least one pocket with a non-gaseous filler material having a filler material density less than said ring body density.

* * * * *